United States Patent
Caldwell et al.

(10) Patent No.: US 7,418,447 B2
(45) Date of Patent: Aug. 26, 2008

(54) NATURAL LANGUAGE PRODUCT COMPARISON GUIDE SYNTHESIZER

(75) Inventors: David Edward Caldwell, Ithaca, NY (US); Michael White, Ithaca, NY (US); Tanya Korelsky, Ithaca, NY (US)

(73) Assignee: CoGenTex, Inc., Ithaca, NY (US)

( * ) Notice: Subject to any disclaimer, the term of this patent is extended or adjusted under 35 U.S.C. 154(b) by 873 days.

(21) Appl. No.: 09/761,604

(22) Filed: Jan. 16, 2001

(65) Prior Publication Data

US 2002/0095411 A1 Jul. 18, 2002

(51) Int. Cl.
*G06F 7/00* (2006.01)
*G06F 17/00* (2006.01)
*G06Q 30/00* (2006.01)

(52) U.S. Cl. ........................ 707/100; 705/26
(58) Field of Classification Search .............. 707/1, 707/2, 5–6, 7, 10, 100–102, 500–500.1; 345/625; 705/10, 27, 26, 7, 38; 715/500.1, 501.1, 715/513

See application file for complete search history.

(56) References Cited

U.S. PATENT DOCUMENTS

| | | | | |
|---|---|---|---|---|
| 6,029,195 | A * | 2/2000 | Herz | 709/219 |
| 6,311,194 | B1 * | 10/2001 | Sheth et al. | 707/505 |
| 6,536,037 | B1 * | 3/2003 | Guheen et al. | 717/151 |
| 2001/0032077 | A1 * | 10/2001 | Tavor | 704/257 |
| 2002/0019763 | A1 * | 2/2002 | Linden et al. | 705/10 |
| 2002/0103692 | A1 * | 8/2002 | Rosenberg et al. | 705/10 |
| 2002/0161664 | A1 * | 10/2002 | Shaya et al. | 705/26 |
| 2003/0105682 | A1 * | 6/2003 | Dicker et al. | 705/27 |
| 2004/0064351 | A1 * | 4/2004 | Mikurak | 705/7 |
| 2004/0138950 | A1 * | 7/2004 | Hyman et al. | 705/14 |

OTHER PUBLICATIONS

O'Donnell et al; "Optimising Text Quality In Generation From Relational Databases" Univ. of Edinbargh, 8 pages.
Carenini, G., "A Task-based Framework to Evaluate Evaluative Arguments", Univ. of Pittsburgh; 12 pages.
Deja.com: Digital Cameras: Side by Side Comparison; Side-by-Side Comparison: Digital Cameras; http://www.deja.com/products/compar . . . 0&CPIDS=117737S383=26&s402=90; 8 pages.
O'Donnell et al; "Optimising Text Quality In Generation From Relational Databases" Univ. of Edinbargh, 8 pages (no day, month, year).
Carenini, G., "A Task-based Framework to Evaluate Evaluative Arguments", Univ. of Pittsburgh; 12 pages. (no day, month, year).
Deja.com: Digital Cameras: Side by Side Comparison; Side-by-Side Comparison: Digital Cameras; http://www.deja.com/products/compar . . . 0&CPIDS=117737S383=26&s402=90; 8 pages (no day, month, year).

* cited by examiner

*Primary Examiner*—Hung T Vy
(74) *Attorney, Agent, or Firm*—Leo B. Kriksunov

(57) ABSTRACT

A Natural Language Product Comparison Guide Synthesizer that lets developers easily create web-based comparison guides for a given type of product. Each comparison guide will solicit users' product requirements, let them compare different products, and recommend one or more products based on their preferences. The guide uses automatically generated natural language to facilitate the comparison of products, and to convey and explain its recommendations.

11 Claims, 3 Drawing Sheets

Fig. 3a

```
procedure SummarizeTopProduct
      let u = current user profile
      let p = product with top ranking (according to u)
      output "The top overall pick is"
(or randomly-selected synonymous generic phrase)
      output brand(p), model(p)
      output "."
      do DescribeMostImportantAndTopRatedFeatures(p,u)
end procedure procedure DescribeMostImportantAndTopRatedFeatures( Product p,
      UserProfile u )
      let topRatedAndMostImportantFeatures =
             list of category features cf such that
                    IsTopRatedFeature(cf,p) = true and
                    IsMostImportantFeature(cf,u) = true
      let topRatedButNotImportantFeatures =
             list of category features cf such that
                    IsTopRatedFeature(cf,p) = true but
                    IsMostImportantFeature(cf,u) = false
      let importantButNotTopRatedFeatures =
             list of category features cf such that
                    IsTopRatedFeature(cf,p) = false but
                    IsMostImportantFeature(cf,u) = true
if topRatedAndMostImportantFeatures is not empty
      output "It has"
      for each cf in topRatedAndMostImportantFeatures, output
             getSuperlativeSnippet(cf)
      output ", which"
      output getAssertImportantSnippet(u)
      output "."
      end if
if importantButNotTopRatedFeatures is not empty
      output "It has lower ratings in"
      for each cf in importantButNotTopRatedFeatures, output
             getFeatureLabel(cf)
      output ", which"
      output getAssertAlsoImportantSnippet(u)
      output "."
      end if
if topRatedButNotImportantFeatures is not empty
      output ", but has high scores in"
      for each cf in topRatedButNotImportantFeatures, output
             getFeatureLabel(cf)
      output "."
      end if
end procedure
```

Fig. 3b

```
function IsTopRatedFeature( CategoryFeature cf, Product p )
     if p's ranking on cf is in top 2 rankings for p,
          return true
     else return false
end function function IsMostImportantFeature( CategoryFeature cf, User u )
     if u's weighting of cf is in top 2 weightings for u,
          return true
     else return false
end function
```

NATURAL LANGUAGE PRODUCT COMPARISON GUIDE SYNTHESIZER

BACKGROUND OF THE INVENTION

1. Field of the Invention

The invention pertains to the field of methods for automatically generating natural language text. More particularly, the invention pertains to generating text which helps a user to compare the features of different products in a given category, and which gives the user recommendations as to which products are best suited to the user's individual needs.

2. Description of Related Art

We are aware of four main examples of software systems which perform some of the same functions as the present invention, but none of which performs all of the functions in combination. Two of these systems are research prototypes described in academic publications; one is a type of interactive wizard found on several commercial websites; and one is a commercial software product for creating web-based expert systems.

The ILEX system (O'Donnell et al., 2000) is designed to generate textual descriptions of objects, such as museum artifacts, using information about the objects stored in a generic relational database. By providing the system with extra information about the semantics of the database, and linguistic resources with which to describe the database objects, the developer can improve the quality and readability of the text generated by the system. Like the present invention, ILEX uses a combination of generic text generation rules and domain-specific lexicon, provided by the developer, to generate textual descriptions. However, unlike the present invention, ILEX requires considerable specialized expertise for the developer to specify the linguistic resources and semantic properties of the database, making this a somewhat open-ended task, rather than a concretely specified and finite process. ILEX is also not specialized to the task of comparing or recommending products.

Carenini (2000) and Carenini & Moore (2000) have described an experimental software system that generates recommendations for users choosing a house in a given neighborhood, based on various attributes of the available houses. Like the present invention, the system generates textual recommendations which are tailored to the user's preferences, and which make use of generic rhetorical patterns for explaining the best features of a given house. However, unlike the present invention, the system is custom-built for the purpose of selecting houses, and does not provide a process for easily extending its domain to other types of products. Its textual output is also limited to recommendations of a particular house, and does not extend to comparisons of two or more houses.

Several commercial web sites, such as www.activebuyersguide.com and www.deja.com, offer wizards that let users search for products in a given category, and rank products according to the user's preferences. Like the present invention, these wizards perform customized ranking of products based on a weighted combination of scores for various features, and lets the user compare products side-by-side, while recommending the top-ranked products. However, unlike the present invention, they do not generate natural language texts to explain comparisons or recommendations, or how they relate to the user's preferences.

The CORVID expert system shell (www.exsys.com) from EXSYS, Inc., of Albuquerque, NM can be used to develop web-based product selection wizards, which recommend products to users based on their preferences. Like the present invention, this product lets the developer create numerous product comparison guides for different product types, and these guides can include natural language explanations of product features. However, unlike the present invention, this product requires the developer to create the logical rules for matching, weighting and scoring product features from scratch for each new product type, as well as the text generation rules. It also does not generate textual descriptions for side-by-side product comparisons.

SUMMARY OF THE INVENTION

The Natural Language Product Comparison Guide Synthesizer of the invention (henceforth, "the Synthesizer") is a software tool that lets developers easily create web-based comparison guides for a given type of product. Each comparison guide will solicit users' product requirements, let them compare different products, and recommend one or more products based on their preferences. The guide will use automatically generated natural language to facilitate the comparison of products, and to convey and explain its recommendations.

The Synthesizer is appropriate for product categories that satisfy the following criteria:

Many different models with similar features are available—a comparison guide will be less useful if there are only a few models of a given product, and comparison is relatively straightforward.

The models have a relatively large number of features that potentially distinguish them—again, if there are only one or two features to consider, comparison is less of a challenge for the user.

The features are of an objective, quantifiable nature—features will have to be compared using a numerical scoring model, so that hard-to-measure things like preferences for different types of books or music will be difficult to process.

The Synthesizer may also be appropriate for certain types of services that can be construed as products inasmuch as they meet these criteria (for example, hotels or car rentals).

The Synthesizer takes the following information as input:

A specification of a set of features that apply to a given class of product, along with various annotations for each feature that will be used by the Synthesizer;

A database of products in the given class, listing the values of these features for each product;

A specification of a set of user profiles, each of which represents the values for each feature that would be appropriate for a given type of user of the product class.

The specifications are produced according to a particular specified process (see below) supported by a developer's interface. From this input, the Synthesizer, which consists of a generic product ranking engine and a generic comparison/recommendation text generator, produces a comparison guide for the products, as a series of HTML pages featuring dynamically generated fluent text that is used to convey product analyses and recommendations tailored to the user requirements and preferences.

BRIEF DESCRIPTION OF THE DRAWING

FIGS. 3a and 3b show a listing of sample pseudocode which illustrates the logic that the Text Generator would use.

DETAILED DESCRIPTION OF THE INVENTION

Figure 1:
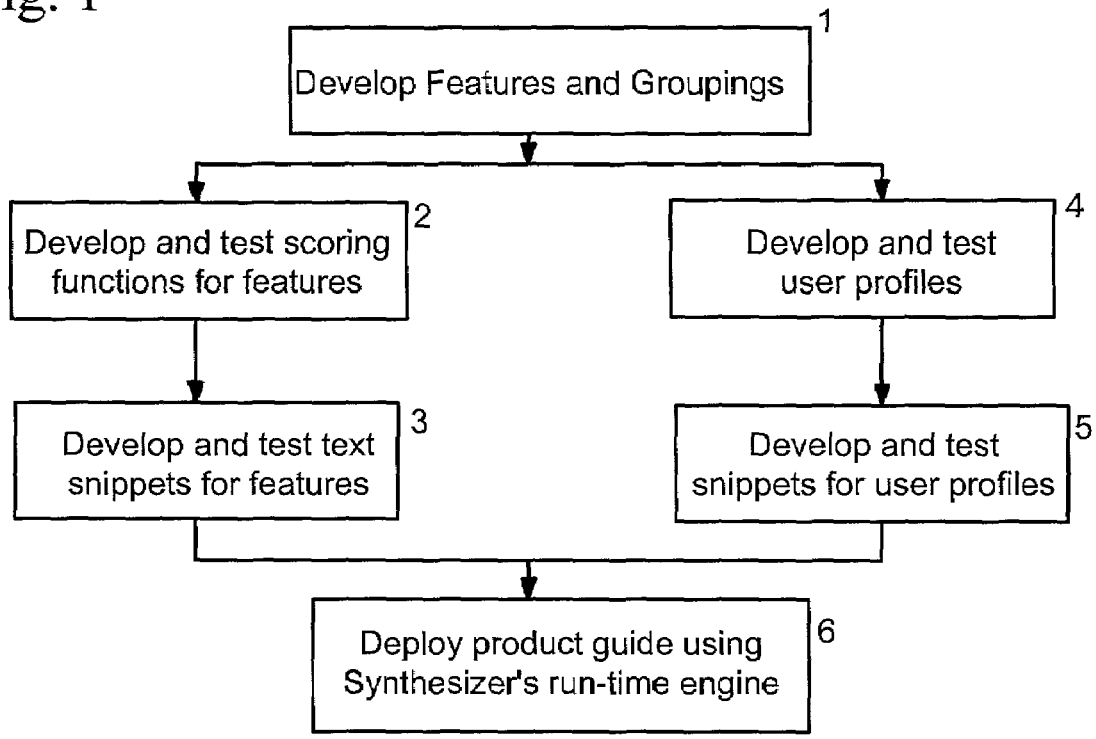
FIG. 1 shows a flowchart of a process for developing a product guide using the Synthesizer.

FIG. 1 shows the process for developing a product guide for a given class of products, using the Synthesizer. This consists of:

(1) developing a set of features that apply to products in the class, and groupings of these features;

(2) developing and testing a scoring function for each feature, which is used to rank different products based on their values of that feature;

(3) developing and testing text "snippets" for each feature, which are phrases to be used by the Text Generator component of the Synthesizer when describing or referring to particular product features;

(4) developing and testing user profiles, which are collections of values of features that are considered to be suitable for different types of users of the product class, and which can serve to help users of the product guide narrow down their product preferences quickly;

(5) developing and testing text snippets for each user profile, which are phrases to be used by the Text Generator component of the Synthesizer when describing or referring to particular user profiles; and (6) deploying the finished product guide.

In steps (1)-(5) the developer interacts with the Synthesizer via its graphical Authoring Interface, while in step (6) the Synthesizer acts as a run-time engine to make the finished product guide available to end users.

Figure 2:
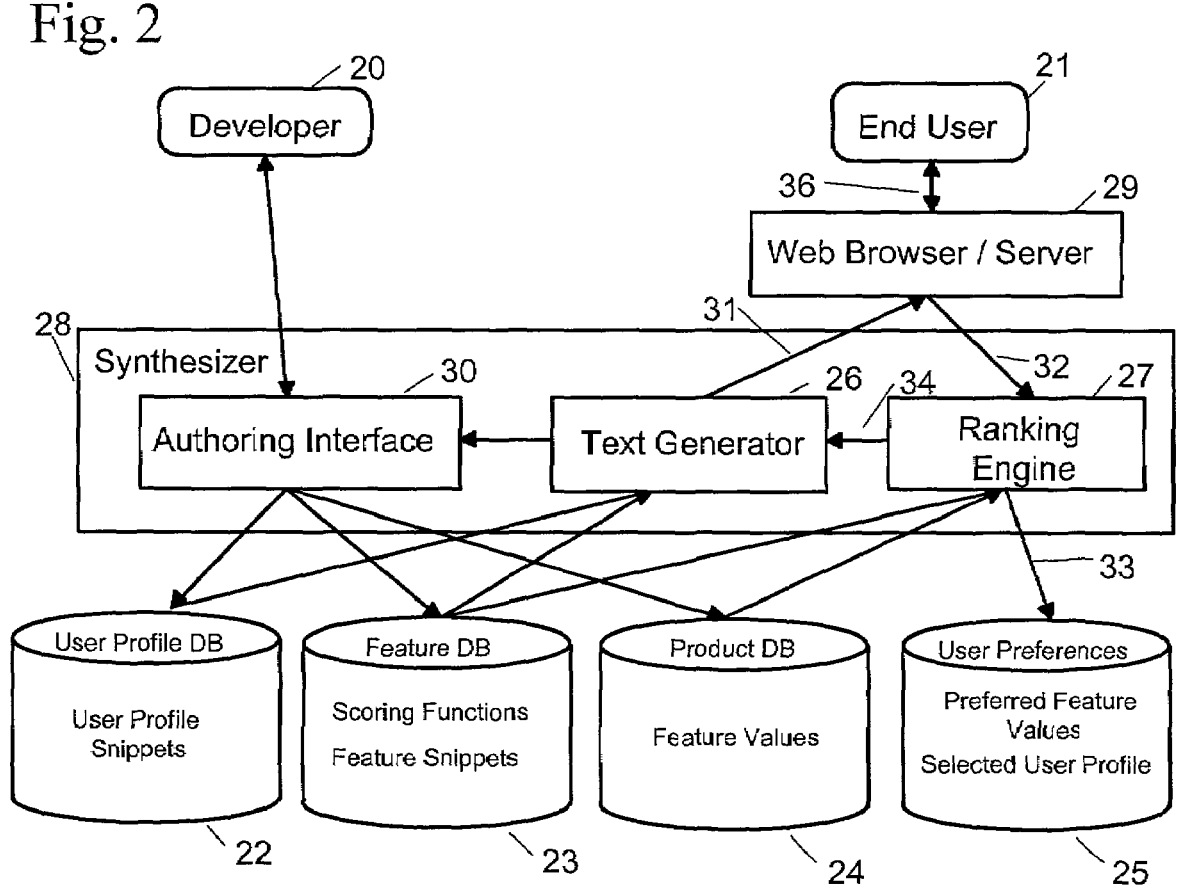
FIG. 2 shows a diagram of data flow between the components of the Synthesizer.

FIG. 2 shows the data flow between the components of the Synthesizer, to demonstrate how it uses the information created in the process described in FIG. 1 to generate an interactive product comparison guide. The developer (20) of the comparison guide interacts with the Synthesizer's (28) Authoring Interface (30) to develop user profiles and snippets (22); to develop features and their associated scoring functions and snippets (23); and to enter or edit feature values in the product database (24). The Authoring Interface (30) uses the Text Generator (26) to generate sample texts that help the developer to create snippets in the proper form.

Once a comparison guide has been developed, an end user (21) of the comparison guide (which may include the developer (20), for testing purposes) interacts with the Synthesizer (28) via a web browser and web server (29). The user (21) makes a request (32) to the Ranking Engine (27), by selecting a user profile and/or specifying preferred values for individual product features. The Ranking Engine (27) stores (33) these user preferences in the user preferences database (25) for future reference. The Ranking Engine (27) then uses the user preferences (33), product feature data (24), and feature scoring functions (23) to generate a ranked list of products, where the rankings are based on each product's score for each feature as computed using its scoring function, which is then weighted according to the user preferences. The Ranking Engine (27) then passes (34) this ranked list to the Text Generator (26), which combines generic phrases with text snippets for individual features (23) and user profiles (22) to generate a web page (31) that displays and explains the product rankings, or displays and explains a comparison between several products. The user can then use links on this web page to change his/her preferences or user profile, or request different recommendations or comparisons, which begins the cycle again.

Let us consider the process for developing a product guide, described in FIG. 1, in more detail.

1. Develop Features and Groupings.

This step consists of determining what features are important for comparison of products in a given class, and how these features should be grouped. The Synthesizer supports three types of features:

i. Boolean features: These are features with simple "yes/no" values for a given product for—example, a digital camera either has the Auto Focus feature, or it does not.

ii. Scalar features: These are features that can have a range of values, represented by a numerical scale—for example, the size in inches of the LCD screen on a digital camera, or its price in dollars.

iii. Category features: These features represent groupings of other "simple" (boolean or scalar) features, which can themselves be viewed as features, in that they can have a value or score associated with them—for example, a category feature for digital cameras called "Convenience" might include the simple features Auto Focus (boolean), Self Timer (boolean), and LCD Display Size (scalar). The value of this category feature would be calculated as a function of the values of the component simple features.

Typically, for a given comparison guide there will be roughly 5-10 category features, each containing up to about 10 simple features.

The design of features and groupings will depend in some cases on existing databases of product features—if such databases already exist in a given format, this may influence the choice of features to include in the product comparison guide. The developer may also choose to add to or modify existing databases to make them more compatible with the feature model used by the Synthesizer. Or if such databases do not yet exist, the developer may wish to design them with the Synthesizer's requirements in mind.

2. Develop and Test Scoring Functions for Features.

Once a set of simple features and groupings has been defined for a given comparison guide, the next step is to develop scoring functions for the features. Again, the details of this step will depend partly on whether product feature databases already exist, and what format they use to store feature data.

When rating products, the Synthesizer will need to retrieve feature values from these databases, for two purposes: (1) to compute a feature score, and (2) to display the feature values to the user of the comparison guide. The requirements on the product data are slightly different for these two purposes: A number is needed to compute the score, while a user-friendly string is needed to display the feature value. For example, with the LCD Screen Size feature for a digital camera, the value of this feature might be displayed in a comparison table as "1.8 in.", whereas a score for the feature might be just the number 1.8 (so that cameras with larger LCD displays would have a higher score on this feature).

The developer can specify the numerical and string values for a feature in one of two ways: (1) store the numerical value for each product in the database, and provide a formatting template to be used to display the value (e.g. "_in."); or (2) store the string value for each product in the database, and specify a rule for extracting the numerical value (e.g. by stripping off the "in." suffix, and interpreting the remaining string as a number).

The developer will also need to specify how scores for category features are computed, as a function of the simple features that they contain. This will normally consist of assigning weights to simple feature scores, in order to determine how each simple feature score contributes to the category feature score—for example, in the Convenience category for digital cameras, the developer may wish to give a higher weighting to the Auto Focus feature than the Self Timer feature, or normalize the LCD Screen Size feature so that it always has a score between 0 and 1, since the other boolean features all have a value of 0 or 1. The value of the LCD Screen Size feature could also be squared, for example, before being normalized, so that the score for this feature would grow in a nonlinear fashion as the screen size increased.

The developer can also change the "polarity" of a simple feature—for example, specifying that larger values are better for the LCD Screen Size feature, while smaller values are better for the Price feature.

The scoring functions specified by the developer in this step will determine how products are scored on a given category feature. These category scores will in turn be weighted according to user preferences, in order to arrive at an overall score for the product in the comparison guide.

3. Develop and Test Text Snippets for Features.

The next step is for the developer to provide a set of textual phrases, or snippets, that can be used by the Synthesizer when generating explanations or recommendations that refer to particular product features. The Synthesizer provides a graphical authoring interface to help the developer specify and test these snippets for each feature that has been specified.

In general, a snippet is a phrase that conveys a fixed semantic message, and is syntactically constructed in such a way that it is guaranteed to result in grammatical text when it is combined with other phrases by the Synthesizer's generic text generator component. For example, for each simple boolean feature, there will be a snippet that conveys the message "Product X has this feature", and must fit in the syntactic frame "<product-name>_____." For the Auto Focus feature, the developer would simply enter a phrase like "has auto focus". The authoring interface would then generate some sample phrases using this snippet (e.g. "Product X and Product Y both have auto focus", or "Product X is the only model with auto focus"), and ask the developer to confirm that these sound correct and fluent, and do not contain grammatical errors, unnecessary repetitions, etc.

For scalar and category features, the developer will provide snippets that allow the Synthesizer to generate text that expresses comparisons between products—for example, "Product X has a larger LCD display than Product Y", or "Of the three models shown, Product X has the most convenience features".

The Synthesizer's authoring interface will also detect patterns of internal structure in text snippets, and ask the developer to confirm these. For example, if the developer enters the snippets is Mac compatible and is PC compatible for two different boolean features, the system will ask the developer to tell it whether it is more correct to say "Product X is Mac and PC compatible", or "Product X is Mac compatible and PC compatible", in the appropriate situation. If there were two snippets has flash override and has flash memory, it would not be correct to generate the phrase "Product X has flash override and memory", because of the two different senses of flash involved.

4. Develop and Test User Profiles.

The developer must next define a set of user profiles for use with the comparison guide. A user profile specifies a value, or range of values, for each simple or category feature that has been developed (see Step 1 above), and is associated with a given type of user of the product class. For example, for digital cameras, the developer might create a "snapshot taker" user profile specifying that the auto focus feature must be present, and the price of the camera must be less than $300.

The "pro photographer" profile might require that the camera have manual focus and exposure control, and at least 3-megapixel resolution.

Besides specifying ranges of actual values for simple or category features, user profiles can specify the weighting of category features when computing overall scores for products—for example, the "snapshot taker" profile would give a high relative weighting to the Convenience category feature and a low weighting to the Manual Controls category feature, while the "pro photographer" profile would do the opposite.

User profiles are designed to make it easy for users of the comparison guide to start comparing products without answering a large number of detailed questions about their requirements first—they can simply select whichever one of a small number of user profiles appears to match them best. However, the user interface for the comparison guide will also let them specify their requirements in more detail—first by specifying explicitly the relative importance (i.e. weighting) of different category features, then by specifying actual values or ranges of values for simple features. For example, a user might start by selecting the "snapshot taker" user profile, and view some ratings and comparisons, but then decide that unlike the typical user in this profile, they did attach a relatively high importance to manual features. They could later decide to specify in particular that they only wanted to look at cameras with manual focus, and a price under $300.

5. Develop and Test Text Snippets for User Profiles.

In order to allow the Synthesizer to present various information related to user profiles, the developer must enter text snippets to be associated with each user profile they create. Unlike the snippets for individual features (see Step 3 above), these snippets will typically be complete sentences or paragraphs, and less checking will be required of possible combinations that might be produced by the text generator. However, they share the property that as long as the snippets are created according to the guidelines provided by the authoring interface, the Synthesizer will apply generic rules to guarantee that the snippets are used to generate complete and correct descriptions in the user interface of the comparison guide.

The snippets required for a user profile would include various phrases used to refer to, describe, or explain it to the user of the comparison guide. For example, to generate an initial screen in which the user is asked to choose a user profile, the Synthesizer would make use of the following snippets for each user profile: (1) a short name (e.g. Snapshot Taker); (2) a descriptive phrase (e.g. I just want to take vacation snapshots, without needing to be a rocket scientist); and (3) one or more paragraphs that give a more detailed description of who fits into this category, or other background information (e.g. Select this one if you are new to photography, or do not want to have to deal with a lot of manual controls, etc.). Other snippets would be used to relate descriptions of individual products back to the user's stated requirements—for example, "Product X has a high rating for convenience features, which makes it a good choice for the average snapshot artist who wants quick results."

6. Deploy Product Guide.

Once the above steps have been completed, the product guide will be ready for deployment to a web site, without need of further customization of the Synthesizer's functionality. Most significantly, there is no need to write any code for the generic procedures of soliciting profiles and preferences from the user, matching a user profile to actual product data, ranking products based on weighted feature scores, or generating and displaying comparisons and recommendations of products. All of these functions will be performed by the Synthesizer, using a combination of generic rules and procedures and the customized data entered by the developer in the previous steps.

The Generic Text Generator

An important component of the Synthesizer (28) is the Text Generator (26), which is capable of combining generic rhetorical phrases with text snippets relating to products in a particular category, in order to produce explanatory texts as part of a product comparison guide. In order to illustrate the function of the Text Generator, let us consider a few example texts, and explain how they would be generated.

When giving a summary of the top-rated products according to a given set of user preferences, the Text Generator might produce the following paragraphs:

The top overall pick is the Epson PhotoPC 650. It has the best collection of convenience features, which is important if you just want to take vacation snapshots, without having to be a rocket scientist. It has lower ratings in Portability and Image Quality, which are also high on the list for the basic snapshot taker, but has high scores in Storage and Connectivity.

The Olympus D-220L is another top finisher—it trails behind the PhotoPC 650 in Convenience, but comes out ahead in Portability and Image Quality, as well as in Performance and Manual Controls.

When describing a detailed comparison between three selected products, the Text Generator might produce this paragraph:

The PhotoPC 650 has the most convenience features. Like the D-220L, it has auto focus and red eye reduction, and the highest zoom factor. But it is also the only model with rechargeable batteries. All three models have a self timer.

The phrases in bold face are text snippets, while the rest of the text is generic. The snippets fall into two categories:

Snippets that are associated with the current user profile, and are used to relate the explanation to the user's requirements (e.g. [which] is important if you just want to take vacation snapshots, . . . or [which are also] priorities for the basic snapshot taker).

Snippets that are associated with category features or simple features, and are used either to convey a particular type of message in relation to a feature (e.g. [It] has the best collection of convenience features or [it has] the highest zoom factor), or to simply mention a category feature by name (e.g. Portability or Image Quality).

Snippets that are associated with a particular product model (e.g. [the] PhotoPC 650). These are normally just names taken directly from the product database, but the Text Generator uses generic rules to decide when to refer to a given product using its full name, a reduced name (e.g. the PhotoPC), or a pronoun (e.g. it).

The important functions that the Text Generator performs in generating the generic text surrounding the snippets include the following:

Inserting random variants of certain generic phrases (e.g. the top overall pick is or is another top finisher is) in order to keep texts from sounding repetitive;

Improving readability of the texts by inserting pronouns in some cases instead of full references to a product by name, according to linguistic rules governing the correct use of pronouns (e.g. The top overall pick is the Epson PhotoPC 650. It has . . . );

Using correct inflections for verbs, according to grammatical rules of number agreement, when the form of a verb depends on the number of snippets that have been inserted in a given situation (e.g. . . . . Portability and Image Quality, which are also . . . );

Generating paragraphs with appropriate overall rhetorical structure in order to convey a recommendation to the user in the most convincing fashion, without mentioning unnecessary information or omitting important facts (for example, the first paragraph above starts with the best features of a product, and explains why these are important for the user, before mentioning other good and important features, and finishes by mentioning good features that are not necessarily important to the user);

Inserting phrases such as but and also, which improve the rhetorical flow and readability of the text, but which must be used in the appropriate circumstances (for example, but must be used to link two statements that somehow contradict each other).

The pseudocode in FIGS. 3a and 3b illustrates the logic that the Text Generator would use to generate the first paragraph above. (Note that this pseudocode is somewhat simplified in its representation of the method used to generate output texts. Rather than simply outputting a series of text strings in sequence, the text generator builds a hierarchical representation of the output text, which is then processed by various rules to ensure correct grammatical inflection, capitalization, punctuation, and spacing, before being output in a format such as HTML.)

The Ranking Engine

The Ranking Engine (27) is also an important component of the Synthesizer (28), although no claims are made as to its novelty. The key features of the ranking engine are the following:

The ability to filter products in the database (24), so that products that do not match the comparison guide user's preferred feature values (25) are eliminated from the ranking of products. For example, if the user specifies that s/he is only interested in digital cameras with auto focus, the ranking engine will eliminate all models that do not have this feature (allowing for the possibility that all models will be eliminated given certain feature combinations, and the user will need to be prompted to relax his/her feature requirements).

The ability to compute scores and rankings for products that meet the user's feature requirements, and to rank them according to these scores. To compute an overall score for a given product, the ranking engine first computes scores for individual features of the product, as determined by the scoring functions provided by the developer. These individual scores are then added up and normalized (for example, as a score out of ten points) for each category feature. The overall score is then calculated as a weighted sum of the category feature scores, where the weighting factor for each category feature is obtained from the user's selected profile and/or explicit choice of a weighting (importance factor) for each category feature. The overall score is again normalized, and the products are ranked according to their overall scores.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

TABLE OF REFERENCES

Carenini, G. (2000). A Task-based Framework to Evaluate Evaluative Arguments. In *Proceedings of the First International Natural Language Generation Conference,* Mitzpe Ramon, Israel.

Carenini, G.; and Moore, J. (2000). A Strategy for Generating Evaluative Arguments. In *Proceedings of the First International Natural Language Generation Conference,* Mitzpe Ramon, Israel.

O'Donnell, M.; Knott, A.; Oberlander, J.; and Mellish, C. (2000). Optimizing text quality in generation from relational databases. In *Proceedings of the First International Natural Language Generation Conference*, Mitzpe Ramon, Israel.

What is claimed is:

1. A method of creating an automated natural language product recommendation system for providing customers with a personalized recommendation of a product having a plurality of features, each customer being associated with a user profile comprising a collection of values of features that are considered to be suitable for a user of the product, comprising the steps of:
 a) developing feature text snippets for each feature, the snippets being phrases to be used when describing or referring to particular product features;
 b) developing user profile text snippets for each user profile, the snippets being phrases to be used when describing or referring to particular user profiles;
 c) providing generic phrases such that combining the generic phrases with feature text snippets and user profile text snippets produces a personalized recommendation for the product featuring dynamically generated fluent text that is used to convey a product analysis and recommendation tailored to the user requirements and preferences.

2. The method of claim 1, in which step (a) further comprises the step of testing the feature text snippets.

3. The method of claim 1, in which step (b) further comprises the step of testing the user profile text snippets.

4. The method of claim 1, further comprising the step of providing access to the product recommendation over a computer network.

5. method of claim 4, further comprising the step of providing customers with product recommendations over a computer network, by combining the generic phrases with feature text snippets and user profile text snippets to produce personalized recommendations for the products featuring dynamically generated fluent text that conveys product analyses and recommendations tailored to the user requirements and preferences.

6. The method of claim 1, further comprising the steps of developing groupings of the features, which serve to organize them thematically, and which groupings can themselves be viewed as features.

7. A method of providing customers with personalized natural language product recommendations over a computer network comprising the steps of:
 a) creating an automated product recommendation system for providing customers with a personalized recommendation of a product having a plurality of features, based on a user profile comprising a collection of values of features that are considered to be suitable for a type of user of the product, comprising the steps of:
  i) developing feature text snippets for each feature, the snippets being phrases to be used when describing or referring to particular product features;
  ii) developing user profile text snippets for each user profile, the snippets being phrases to be used when describing or referring to particular user profiles; and
  iii) providing generic phrases;
 b) accepting a request from a customer over a computer network, the request comprising selecting a user profile defining preferred values for product features;
 c) generating a ranked list of products using preferred values from the user profile, and product feature data, such that rankings are based on each product's feature data weighted according to the preferred values;
 d) combining generic phrases with feature text snippets for individual features and user profile text snippets for user profiles to generate a display comprising a personalized recommendation of a product featuring dynamically generated fluent text that is used to convey a product analysis and recommendation tailored to the user requirements and preferences; and
 e) returning the display to the customer over the computer network.

8. The method of claim 7, in which step (b) further comprises the step of storing the preferred values in a user preferences database.

9. The method of claim 7, in which the preferred values from step (b) are requested by specifying a user preference from a database.

10. The method of claim 7, in which the display generated in step (d) comprises at least a display and explanation of product rankings based on user requirements and preferences.

11. The method of claim 7, further comprising the steps of developing groupings of the features, which serve to organize them thematically, and which groupings can themselves be viewed as features.

* * * * *